United States Patent
Matsumoto et al.

(10) Patent No.: US 7,427,916 B2
(45) Date of Patent: Sep. 23, 2008

(54) METHOD FOR INSPECTING AND MONITORING BUILDING, STRUCTURE, OR FACILITIES ACCOMPANYING THEM

(75) Inventors: Kazuhiko Matsumoto, Kawasaki (JP); Toshiyuki Aritsuka, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 37 days.

(21) Appl. No.: 11/115,269

(22) Filed: Apr. 27, 2005

(65) Prior Publication Data
US 2005/0242943 A1 Nov. 3, 2005

(30) Foreign Application Priority Data
Apr. 28, 2004 (JP) .............................. 2004-132480

(51) Int. Cl.
*G08B 19/00* (2006.01)
(52) U.S. Cl. .................. 340/521; 340/524; 340/511; 340/3.1; 340/572.1; 702/33; 370/254
(58) Field of Classification Search .......... 340/511, 340/3.1, 506, 572.1, 520, 521, 524; 702/33; 370/254, 475, 453
See application file for complete search history.

(56) References Cited

U.S. PATENT DOCUMENTS

| | | | |
|---|---|---|---|
| 5,225,996 A | * | 7/1993 | Weber ........................ 702/187 |
| 5,909,429 A | * | 6/1999 | Satyanarayana et al. ..... 370/254 |
| 6,917,288 B2 | * | 7/2005 | Kimmel et al. ............. 340/511 |
| 7,019,650 B2 | * | 3/2006 | Volpi et al. ................ 340/572.1 |
| 2002/0019725 A1 | | 2/2002 | Petite |
| 2002/0174367 A1 | | 11/2002 | Kimmel et al. |

FOREIGN PATENT DOCUMENTS

| | | |
|---|---|---|
| CN | 1199524 | 11/1998 |
| JP | 11-322249 | 11/1999 |
| JP | 2002-351927 | 12/2002 |

OTHER PUBLICATIONS

Ian. F Akyildiz et al. "A Survey on Sensor Networks", IEEE Communication Magazine, pp. 102-114, Aug. 2002.

* cited by examiner

*Primary Examiner*—Anh V. La
(74) *Attorney, Agent, or Firm*—Antonelli, Terry, Stout & Kraus, LLP.

(57) ABSTRACT

A method for performing maintenance inspection and monitoring of various structures and facilities by arranging a sensor on a moving portion of the facility of a building or a portion where wiring is difficult. The method includes a step of constructing a sensor network in accordance with the identification information on the facility, a step of acquiring the state of the facility by using the sensor network constructed, and a step of performing inspection or monitoring according to the acquired information on the state of the facility.

18 Claims, 14 Drawing Sheets

FIG.8

SYSTEM CONTROL DEVICE 801

| NO. | SENSOR TYPE/ BASE STATION | INSTALLATION POSITION INSTRUCTION | | |
|---|---|---|---|---|
| 1 | SA | LSA1 | | |
| 2 | SA | LSA2 | | |
| 3 | SA | LSA3 | | |
| 4 | SA | LSA4 | | |
| ... | ... | ... | | |
| 9 | SB | LSB1 | | |
| 10 | SB | LSB2 | | |
| ... | ... | ... | | |
| | | | | |
| 101 | BS | LBS1 | | |
| 102 | BS | LBS2 | | |
| ... | ... | ... | | |

SENSOR NODE/BASE STATION LIST    901

| ID | MEASUREMENT POSITION | INSTALLATION POSITION | COMMUNICATION ENABLED BASE STATION/ SENSOR |
|---|---|---|---|
| N1 | LSA2 | ○ | BN101, BN102 |
| N2 | LSA1 | ○ | BN102 |
| N3 | LSA3 | ○ | BN101 |
| ? | ? | × | ? |
| ... | ... | ... | ... |
| N9 | LSB1 | ○ | BN101 |
| N10 | LSB1 | ○ | BN101 |
| ... | ... | ... | ... |
| | | | |
| BN101 | LBS1 | ○ | N1, N3, N9, N10, ... |
| BN102 | LBS2 | ○ | N1, N2, ... |
| ... | ... | ... | ... |

FIG.12

SENSOR NODE/BASE STATION LIST 901

| ID (1005) | MEASUREMENT POSITION (1002) | INSTALLATION POSITION (1003) | COMMUNICATION ENABLED BASE STATION/ SENSOR (1004) | |
|---|---|---|---|---|
| N1 | LSA2 | ○ | BN101, BN102 | |
| N2 | LSA1 | ○ | BN102 | |
| N3 | LSA3 | ○ | BN101 | |
| N4 | LSA4 | ○ | BN101 | |
| ... | ... | ... | ... | |
| N9 | LSB1 | ○ | BN101 | |
| N10 | LSB1 | ○ | BN101 | |
| ... | ... | ... | ... | |
| | | | | |
| BN101 | LBS1 | ○ | N1, N3, N4, N9, N10, ... | |
| BN102 | LBS2 | ○ | N1, N2, ... | |
| ... | ... | ... | ... | |

FIG.13

SYSTEM CONTROL DEVICE 801

| NO. | SENSOR TYPE/ BASE STATION | INSTALLATION POSITION INSTRUCTION | ID | |
|---|---|---|---|---|
| 1 | SA | LSA1 | N1 | |
| 2 | SA | LSA2 | N2 | |
| 3 | SA | LSA3 | N3 | |
| 4 | SA | LSA4 | N4 | |
| ... | ... | ... | ... | |
| 9 | SB | LSB1 | N9 | |
| 10 | SB | LSB2 | N10 | |
| ... | ... | ... | ... | |
| | | | | |
| 101 | BS | LBS1 | BN101 | |
| 102 | BS | LBS2 | BN102 | |
| ... | ... | ... | ... | |

(802, 803, 1005)

METHOD FOR INSPECTING AND MONITORING BUILDING, STRUCTURE, OR FACILITIES ACCOMPANYING THEM

INCORPORATION BY REFERENCE

The present application claims priority from Japanese application JP 2004-132480 filed on Apr. 28, 2004, the content of which is hereby incorporated by reference into this application.

BACKGROUND OF THE INVENTION

The present invention relates to a method for inspecting and monitoring a building including an apartment house and a structure such as a bridge as well as facilities installed in the building and the structure such as an elevator and an air conditioner and in particular, to an inspection and monitoring method using a sensor network.

Recently the information technology has made a great progress and has been widely spread. The Internet has been spread in ordinary homes. Furthermore, mobile devices such as mobile telephones are spread and connected to the Internet. Moreover, a network such as wireless LAN is also widely spread in homes and offices.

Moreover, recently, instead of the conventional bar code, RFID (Radio Frequency ID, also called IC tag, ID tag) is widely spread for various purposes.

Furthermore, the sensor technique is improved by reducing the sensor size and power consumption, and adding a generator mechanism, thereby increasing the user-friendliness.

As a technique unifying these, a sensor network can be exemplified (see, for example, Ian. F Akyildiz et al "A Survey on Sensor Networks", IEEE Communication Magazine, pp. 102-114, August 2002). Various sensors constitute a network so that communication is performed between the sensors or between the sensors and the RFID. A base station which can communicate with them acquires sensing information and sends it to a system control device where various processes are performed. Especially wireless sensor network performing radio communication does not require wiring and can be easily installed or extended. The sensor network technique has been used mainly for military purpose in the United States but now it is also used for civil purpose. However, full-scale application it just to begin.

The technique constituting the sensor network can be used as follows.

Firstly, the Internet is used for reading and acquiring commodity information on the WEB and order/purchase of commodity through correspondence sales. Moreover, the monitoring video of a camera and the like can be received and viewed. A personal computer and peripheral device at home and in an office are connected by the wireless LAN for communication.

The RFID is used for reading the content of the RFID attached to each commodity stored in a warehouse by an RFID reader capable of radio communication, thereby easily performing stock management. Moreover, the RFID is used for traceability of the commodity.

The sensor itself has been widely used conventionally and its application is being increased. For example, the sensor is used for detecting the remaining amount of consumption articles such as printer ink, monitoring the remaining amount of an oil tank, detecting an intruder into a building, and detecting a user for operating an escalator in a stop state.

It should be noted that as the technique for realizing facility inspection/monitoring cost reduction, JP-A-11-322249 discloses a method for reducing the facility operation stop time by monitoring the abrasion and deterioration and JP-A-2002-351927 discloses a method for accurately grasping the sensor mounting position.

Conventionally, various sensors have been used for maintenance inspection, maintenance inspection when an abnormality has occurred, ordinary monitoring or remote monitoring (hereinafter, the maintenance inspection and the maintenance inspection when an abnormality has occurred are referred to simply as inspection while the ordinary monitoring and remote monitoring are referred to simply as monitoring unless otherwise specified) of buildings including apartment houses and structures such as bridges and tunnels as well as facilities installed in the buildings and the structures such as elevators and air conditioners (hereinafter, the buildings, the structures, and facilities are referred to simply as facilities unless otherwise specified).

SUMMARY OF THE INVENTION

It is expected to reduce the cost of the inspection and the monitoring. For example, what is required is:

(1) reduction of facility stop time (or closed time to traffic); and (2) reduction of sensor installation cost (sensor cost, wiring cost, etc.).

Furthermore, assuring a power source for a sensor and other devices is also a big cost problem, especially when performing continuous monitoring in a place where wiring is difficult.

In order to realize the objective (1), it is necessary to perform continuous remote monitoring to find a problem such as deterioration before occurrence of a trouble and increase the monitoring items but this goes against the objective (2). Moreover, in order to realize the objective (2), it is possible to temporarily install an expensive sensor upon inspection instead of keeping it installed all the time and reduce the wiring cost by utilizing a wireless sensor network. However, if the sensor is installed each time when inspection is performed, it becomes difficult to reduce the stop time against the objective (1) and the labor cost is increased against the objective (2). Even when a wireless sensor network is used, the sensor itself may be expensive. Thus, it is possible to simultaneously realize the objectives (1) and (2). Considering the trade off, it is necessary to realize the total cost reduction of the objectives (1) and (2). It may safely be said that use of a wireless sensor network is an advantageous method for realizing the total cost reduction in the objectives (1) and (2).

As has been described above, use of a combination of the information technology and the sensor technology in the inspection and monitoring of various facilities is increased. It is becoming important to realize a user-friendly low-cost inspection/monitoring system. However, the conventional facility inspection/monitoring system has the problems described in the Background of the Invention. A technique for solving the problems has been developed. However, still following problems remain.

JP-A-11-322249 discloses a maintenance/inspection method for a passenger conveyer such as an elevator and a moving pavement. The passenger conveyer is a moving object and finding of its wear-out and deterioration at an early stage leads to prevention of trouble and reduction of time required for maintenance/inspection. JP-A-11-322249 discloses a system including a sensor for detecting wear-out and deterioration of a moving portion such as an oil pan contamination detector and a hand rail drive chain expansion detector for continuous monitoring. It should be noted that the sensors are not installed directly on the moving portion but indirectly monitor the state of the moving portion. Accordingly, they have a problem that their detection of wear-out and deterioration are not so accurate as compared to the direct monitoring of the moving portion. Furthermore, there is a problem that the number of sensors should be increased as compared to the direct monitoring.

Thus, the configuration example of JP-A-11-322249 monitor wear-out and deterioration of the moving portion by using sensors but cannot realize sufficient cost reduction because of the following reasons:

(1) Since the moving portion is indirectly inspected and monitored, the accuracy is low as compared to the direct inspection and monitoring (2) Since the moving portion is indirectly inspected and monitored, the more number of sensors may be required as compared to the direct inspection and monitoring.

On the other hand, JP-A-2002-351927 discloses a method for identifying the sensor position in the sensor network. In this example, the position of a fixed sensor is identified by using position data stored in the sensor and the position of a mobile sensor is identified in the relay station area with which the sensor is communicating or by using the GPS. However, this can identify the position of the sensor installed but cannot instruct a position where the sensor is to be installed.

Thus, JP-A-2002-351927 shows a configuration example capable of identifying the position of the installed sensor but has a problem that it cannot realize sufficient reduction of the time required for building the sensor network because of the following reasons:

(1) Since no position for installing the sensor is indicated, it is necessary to search and check the installation position and the sensor installation requires a time.

(2) Position identification by the relay station area and the GPS cannot obtain a sufficiently accurate position measurement.

It is therefore an object of the present invention to temporarily build a sensor network and provide a method for performing inspection and monitoring of various facilities while reducing the cost required for inspection and monitoring.

Another object of the present invention is to use a wireless sensor network so that no wiring is required and the wiring cost is reduced. In addition to this, the sensor can easily be installed on a moving portion and it is possible to accurately inspect and monitor items which cannot be inspected or monitored by using the conventional sensor due to the wiring difficulty and items which cannot be accurately measured by the conventional method. Moreover, when adding a new item to be inspected and monitored, a new sensor can be easily installed in addition to the existing sensor and flexibly add/modify the inspection and monitoring items.

Yet another object of the present invention is to provide a method for simply instructing the sensor type and its installation position required for building a sensor network so that the sensor network can be built by an inexperienced maintenance staff and the inspection and monitoring can be effectively performed.

Still another object of the present invention is to provide a method capable of reducing the inspection cost by easily detaching the expensive sensor after inspection so that it can be used for another inspection instead of installing the sensor at a place all the time.

The invention disclosed by this application is as follows. That is, the method for inspecting or monitoring buildings, structures, or facilities accompanying them relates to building of a sensor network according to identification information on facilities upon inspection/monitoring the facilities, acquiring information on the state of the facilities by using the sensor network which has been built, and performing inspection or monitoring according to the information associated on the states of the facilities acquired.

When sensor nodes or a base station usable as the sensor network are already installed in the facilities, it is preferable to additionally install a necessary sensor node or a base station to built a sensor network.

The identification information includes at least one of the device number, the manufacturing number, and the installation number of the facility which is stored in the control information database accompanying the system control device of the system for inspecting and monitoring the facility. It is preferable that the control information database accompanying the system control device store the sensor node installation place and the base station installation place stored corresponding to the identification information. However, the present invention is not to be limited to this.

It is preferable that the sensor node installation place and the base station installation place be displayed in combination with the form of the facility on the display device connected to the mobile terminal. However, the present invention is not to be limited to this.

It is preferable that the sensor node installation place and the base station installation place be searched by the RFID installed in advance. However, the present invention is not to be limited to this.

It is preferable that the identification information on the facility be read by the RFID or the barcode installed in advance in the facility. However, the present invention is not to be limited to this.

It is preferable that the position where the sensor node and the installation station contained in the sensor network are to be installed be compared to the position after the installation and a unique ID be assigned to the sensor node and the base station matched. However, the present invention is not to be limited to this.

It is preferable that the position after the installation be measured by the three-point measurement method. However, the present invention is not to be limited to this.

It is preferable that a unique ID be assigned to the sensor node and the base station contained in the sensor network. However, the present invention is not to be limited to this.

It is preferable that all or some of the sensor nodes or base stations constituting the network be removable. However, the present invention is not to be limited to this.

It is preferable that the removal of some of the sensor nodes or the base stations from the sensor network be such that a smaller sensor network than the aforementioned sensor network is left. However, the present invention is not to be limited to this.

It is preferable that the smaller sensor network be used for monitoring of the facility. However, the present invention is not to be limited to this.

According to this invention, it is possible to temporarily and easily built a system for inspecting and monitoring various facilities. Accordingly, it is possible to easily inspect and monitor facilities for which conventionally no inspection and monitoring facilities have been used.

Moreover, by using the wireless sensor network, there is no need of wiring, which reduces the wiring cost and enables installation of the sensor in the moving portion. Moreover, items which could not inspected or monitored by using the conventional sensor due to difficulty of wiring of items which could not measured accurately can be inspected and monitored. When adding a new item for inspection and monitoring, it is possible to easily add a new sensor to the existing sensor. Thus, it is possible to flexibly add/modify the inspection and monitoring items.

Furthermore, it is possible to easily instruct the sensor type and its installation position required for constructing a sensor network. Even an inexperienced maintenance staff can build a sensor network in a short time and effectively perform inspection and monitoring.

Furthermore, since it is possible to easily detach the sensor after inspection, it is possible to use an expensive sensor for another purpose without keeping it at the same place all the time. Moreover, there is no need of maintenance management of the inspection facility.

Other objects, features and advantages of the invention will become apparent from the following description of the embodiments of the invention taken in conjunction with the accompanying drawings.

BRIEF DESCRIPTION OF THE DRAWINGS

FIG. 8 shows an example of installation position instruction for installation of the sensor node and the base station.

FIG. 10 shows an installation condition example of the sensor node and the base station.

FIG. 12 shows an installation condition example of the sensor node and the base station.

FIG. 13 shows an installation condition example of the sensor node and the base station.

DESCRIPTION OF THE EMBODIMENTS

Description will now be directed to preferred embodiments of the present invention with reference to the attached drawings.

Firstly, explanation will be given on the basic configuration of the wireless sensor network with reference to FIG. 2, FIG. 3, and FIG. 4. In the explanation below, the wireless sensor network will be referred to simply as a sensor network unless otherwise specified.

Figure 2:
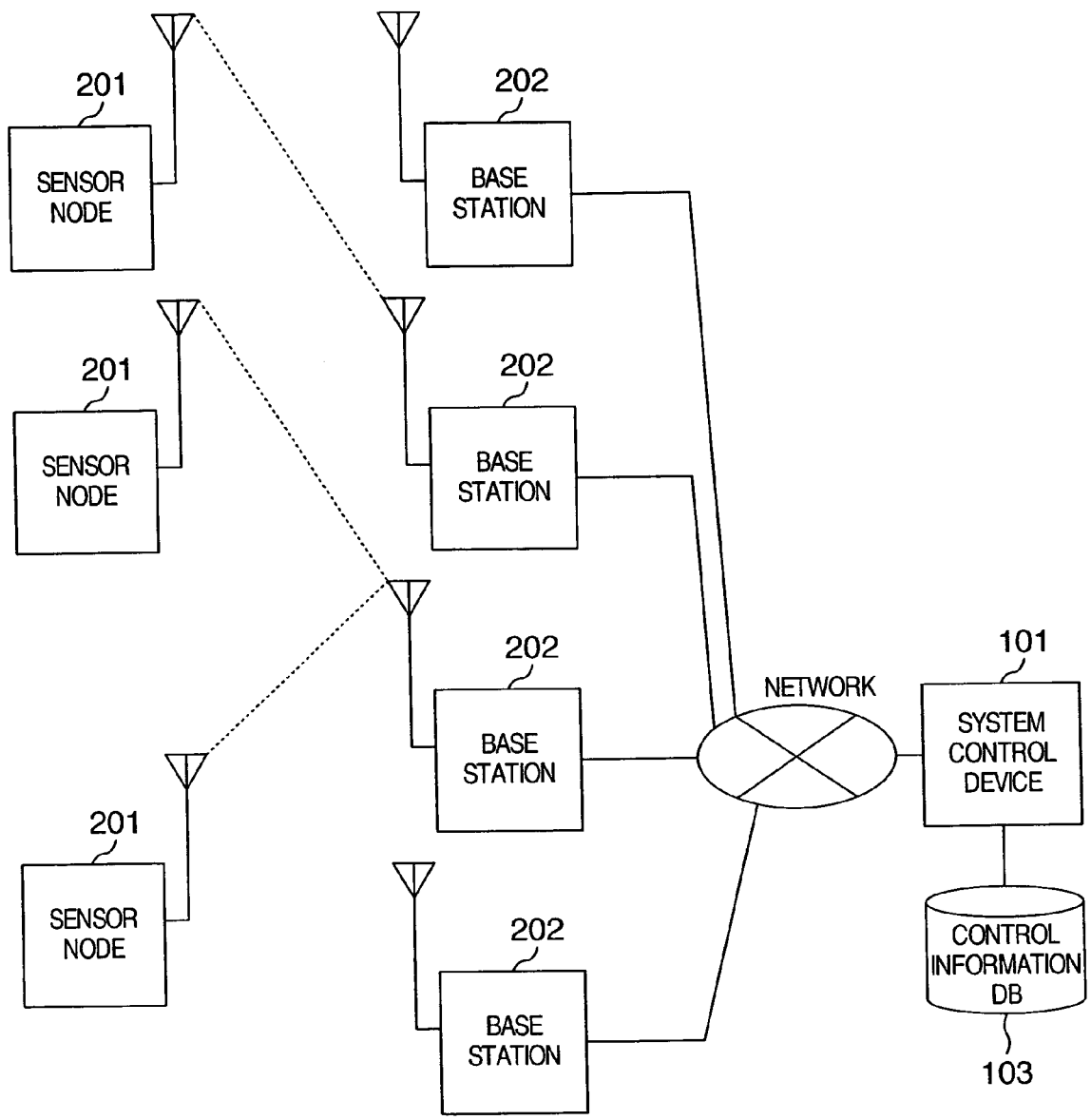
FIG. 2 shows a basic configuration example of the sensor network.

FIG. 2 is a connection configuration diagram of the sensor network. A sensor node 201 is connected to various sensors. The sensor node 201 sends sensing data and other information from the sensor to the base station. The sensing data and other information is transmitted via the base station 202 and the network to a system control device 101 and stored in a control information database 103. Here, the information transmitted from the base station 202 to the system control device 101 includes a sensor measurement value, a sensor measurement time, and sensor node identification information contained in a radio packet transmitted from each sensor node 201 and the tune when the radio packet is received at the base station and ID information on the base station which has received the radio packet.

The system control device 101 has a system management function and furthermore if it can have built-in application system software utilizing sensor information, it is possible to realize a dedicated server, a personal computer, and the like. Moreover, in this embodiment, a display terminal device 102 is required for displaying the execution result of the application system. This may be a display terminal dedicated to the system control device 101 or a mobile terminal communicating with the system control device 101 for display.

Figure 3A:
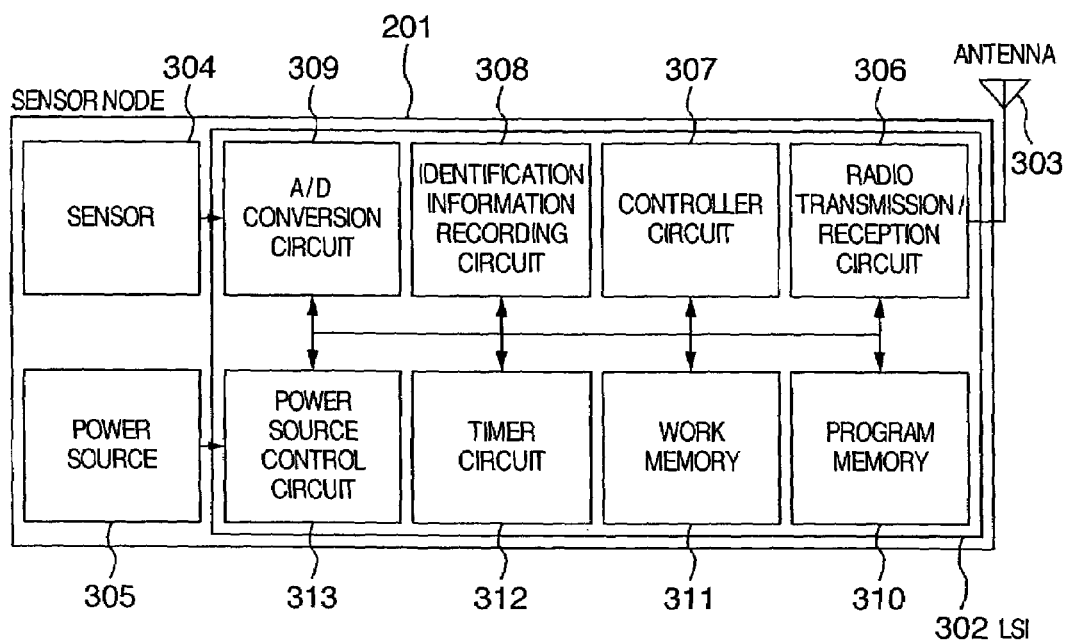
FIG. 3A and FIG. 3B shows a configuration example and an external view of a sensor node, respectively.
Figure 3B:
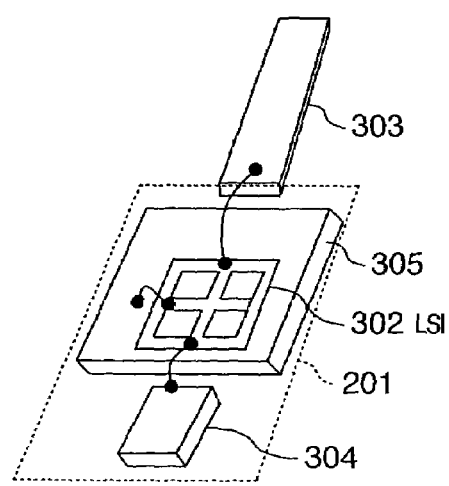

FIG. 3A and FIG. 3B shows a block configuration and an external image of a sensor node 201, respectively. As shown in FIG. 3A, the sensor node 201 includes a processor LSI (Large Scale Integrated Circuit) 302 for realizing its main function, an antenna 303 for transmitting and receiving data to/from a base station 202, a sensor 304 for inputting data from outside, and a power source 305. The power source 305 includes a primary battery, a secondary battery (rechargeable battery), and a generation element (solar light generation element, vibration generation element, micro wave generation element, and the like), and a capacitor for accumulating electric energy or a secondary battery or a combination of these batteries. The LSI 302 includes: a radio transmission/reception circuit 306 connected to the antenna 303 and controlling data transmission/reception to/from the base station 202; a controller circuit 307 which is a CPU (Central Processing Unit) for controlling the entire LSI 302; an identification information recording circuit 308 which is a non-volatile memory (such as a flash memory) for recording identification information on the sensor node 201; an A/D conversion circuit for analog/digital-converting the data inputted from the sensor 304; a program memory which is a ROM (Read Only Memory) for recording a program; a work memory 311 which is a work RAM (Random Access Memory) for executing the program; a timer circuit for generating a signal at a predetermined interval (clock signal); and a power control circuit 313 for adjusting power supplied from the power source 305 to be at a constant voltage and cutting off power when no power is required, thereby suppressing power consumption. The LSI 302 is not to be limited to a single chip but may be a board or an MCP (Multi Chip Package) on which a plurality of chips are mounted.

Moreover, as shown in FIG. 3B, the sensor node 201 is divided to the antenna 303, the sensor node 201, and the sensor 304. On the main body of the sensor node 201, the LSI 302 and the power source 304 are provided. As the identification information recorded on the identification information recording circuit 308, there are a unique ID number between the sensor nodes, ID of the object to which the sensor node is attached, and its attribute.

Figure 4A:
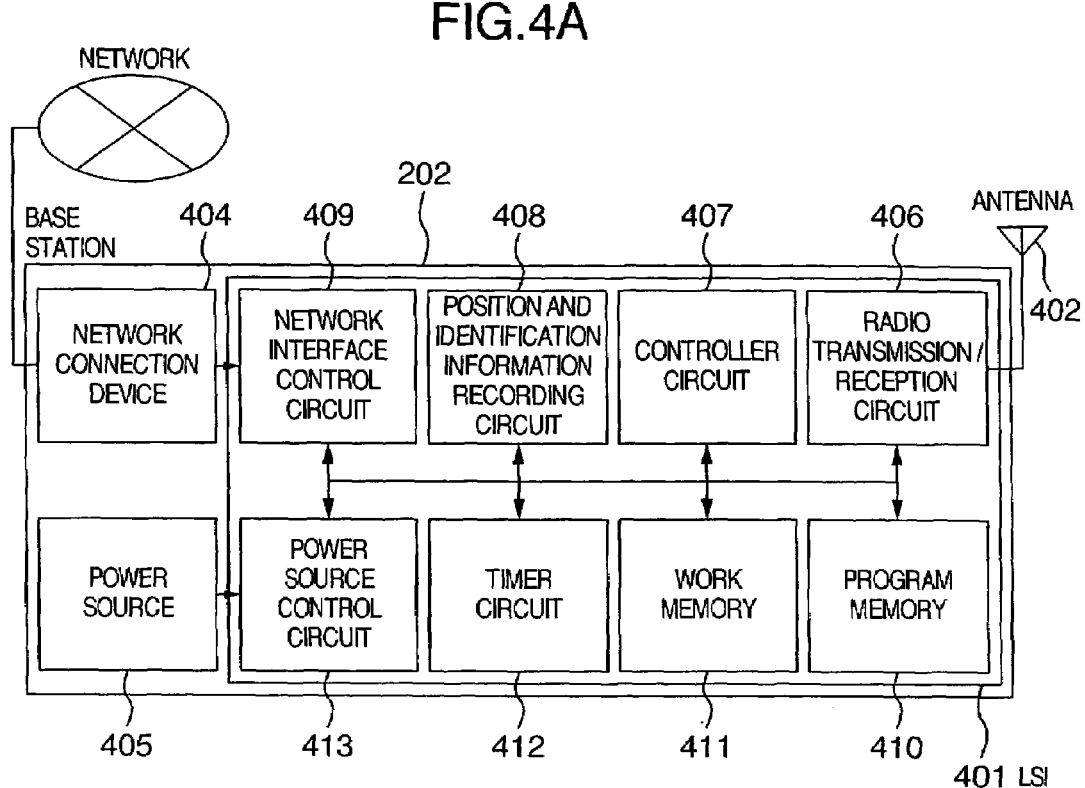
FIG. 4A and FIG. 4B shows a configuration example and an external view of a base station, respectively.
Figure 4B:
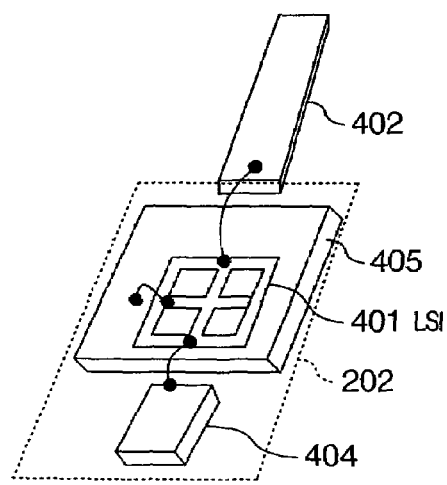

FIG. 4A and FIG. 4B show a block configuration and an external image of a base station. As shown in FIG. 4A, the base station includes: an LSI 401; an antenna 402 for transmitting and receiving data to/from the sensor node 201; a network connection device 401 for connection to the network; and a power source 405. The LSI 401 includes; a radio transmission/reception circuit 406 for controlling data transmission/reception to/from the sensor node 201; a controller circuit 407; a position and ID recording circuit 408 which is a non-volatile memory (such as a flash memory) for recording information associated with the position measurement of the sensor node 201 (specifically, transmission/reception time of the radio packet and radio field intensity) and coil ID information; a network interface circuit 409 for controlling data transmission/reception to/from the network according to the network protocol; a program memory 410; a work memory 411; a timer circuit 412; and a power source control circuit 413.

Moreover, as shown in FIG. 4B, the external view of the base station 202 is divided into the antenna 402, the base station 202, and the network connection device 404. On the main body of the base station 202, the LSI 401 and the power source 405 are provided. The power source 405 of the base station 202 may have the same configuration as the power source 305. However, it is preferable to use commercial power source, if possible, for obtaining stable operation.

It should be noted that the configuration of the network is not to be limited to the configuration of FIG. 2. Between the sensor node 201 and the base station 202, it is also possible to install a relay station not connected to a network outside the sensor network. The relay station may have the same basic configuration as the base station 202. Moreover, the sensor node 201 itself may have the function of the relay station so as to enable communication between the sensor nodes 201.

Figure 5:
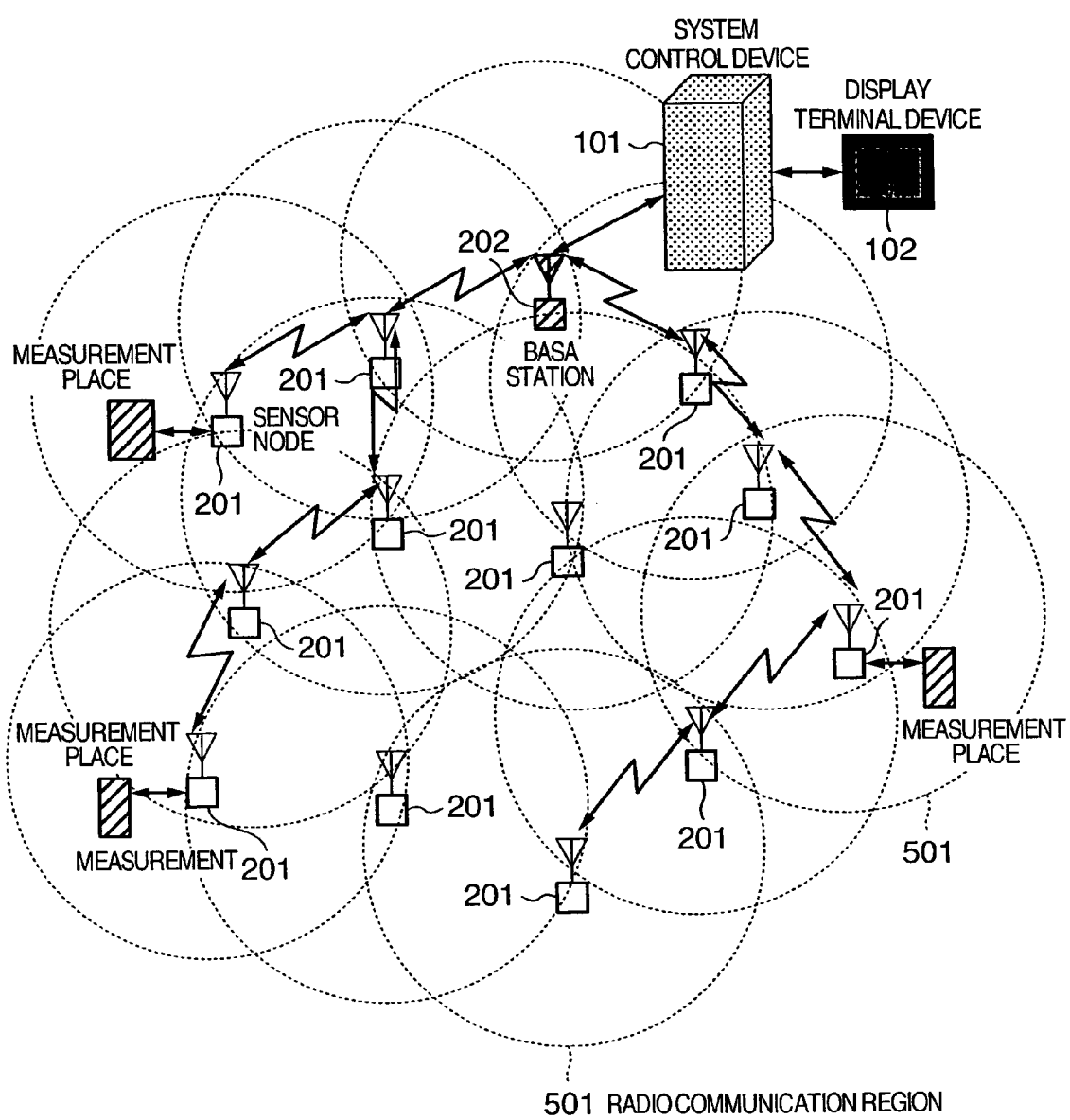
FIG. 5 shows an example of a communication path of the sensor network.

Next, as shown in FIG. 5, each of the sensor nodes 201 and each of the base stations 202 should be arranged so as to satisfy the following condition.

The condition is that one or more communication routes (indicated by bi-directional arrows in FIG. 5) can be established from an arbitrary sensor node 201 to the system control device 101 via other sensor nodes 201 and the base station (or relay station) 202 in the sensor network.

It is preferable to assure a plurality of routes if failure and stability are considered.

The aforementioned condition can be expressed in other words as follows: at least one node exists within a radio communication enabled area 501 (area indicated by dotted circle) for each of the arbitrary sensor node 201 and the base station (or relay station) 202 (hereinafter, referred to simply as a node) and when nodes within the radio communication enabled area 501 are connected each other, a single connection graph may be created. Of course, the radio communication enabled area is a model and may not be a circle. Moreover, the size of the radio communication enabled area for each node may be different. Furthermore, it is preferable that a plurality of radio communication paths exist, i.e., plurality of paths exist from a node corresponding to the base station 201 to another arbitrary node.

The aforementioned is the configuration of the sensor network. Moreover, in the embodiments explained below, it is assumed that the system control device 101 has a built-in program for inspection and monitoring. Moreover, it is assumed that the system control device 101 is connected to the Internet. However, these are not to limit the present invention but represent one form as an example. Hereinafter, the best modes for carrying out the present invention will be explained.

Embodiment 1

Here, the present invention is explained by using an example of periodical maintenance inspection of an escalator installed in a building. Here, for simplification of explanation, it is assumed that the escalator facility has sensors for the normal ordinary monitoring but no sensors utilized for periodical maintenance inspection.

Figure 1:
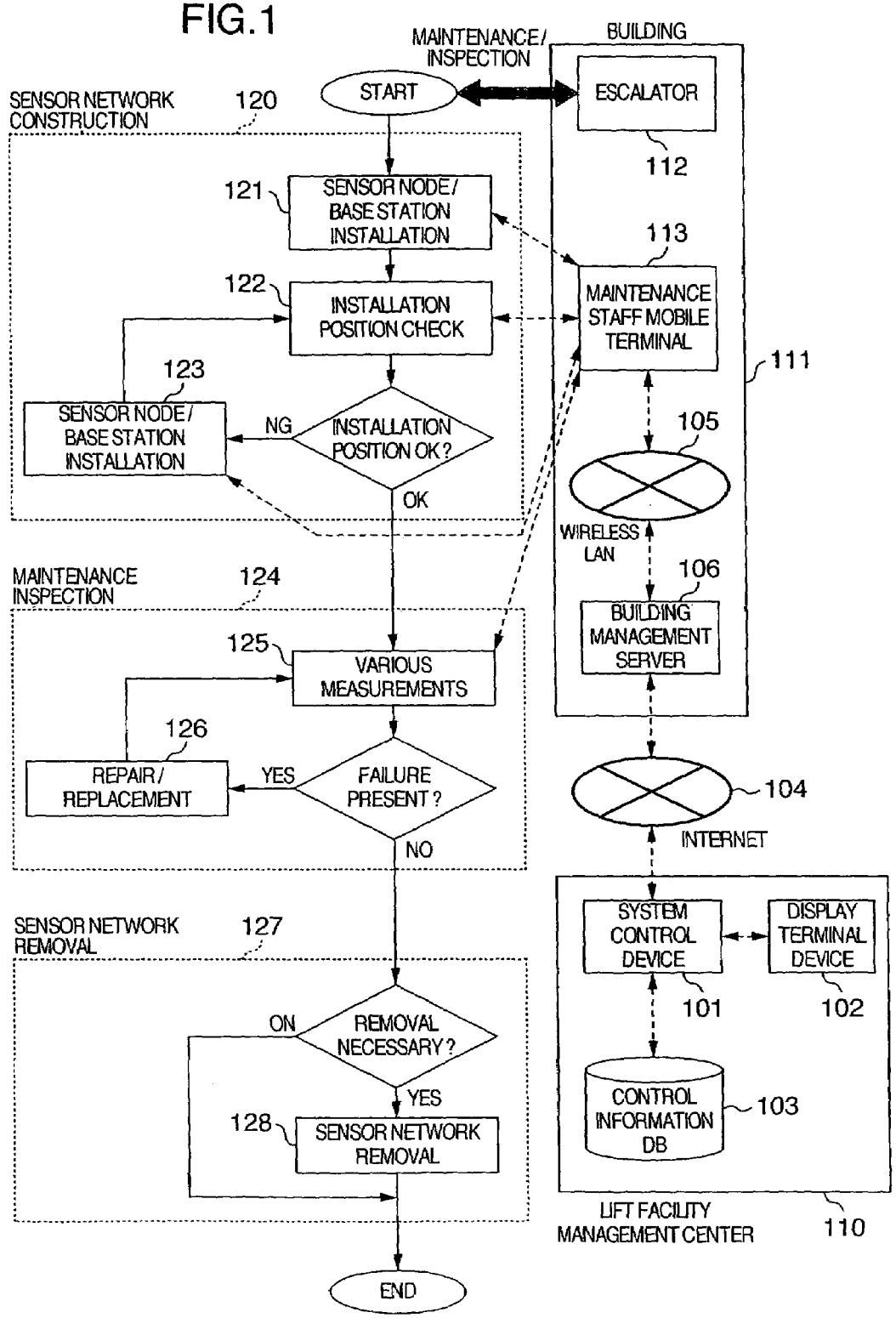
FIG. 1 is a flowchart showing the entire process of the invention.

Referring to FIG. 1, explanation will be given on the condition of the facility for maintenance inspection.

A maintenance company has a lift facility management center 110 and a system control device 101 for inspection and monitoring. The system control device 101 is connected to a display terminal device 102. The system control device 101 has a control information database 103 containing various information associated with the facilities (escalator in this example) to be managed. Here, the various information associated with the facilities to be managed include; a facility model (model number), a manufacturing number, an installation place, an installation date, inspection items, inspection history (date, inspection result, repair, parts replacement items), and the like. Various diagnosis programs of the facility and the countermeasure for failure are also stored. Moreover, the present embodiment is characterized in that the sensor node attachment position and type are also stored upon inspection. For example, the sensor node type is classified by the power source type, communication speed, size, weight, mounting method, the type of built-in sensor, and the like.

On the other hand, in the building 113 where the escalator 112 is installed, a building managing server 106 is installed, for relay, for full-time collecting monitoring data and transmitting the data to the lift facility management center 110 via the Internet. The system control device 101 of the maintenance company receives the monitor data via the Internet from the building management server 106. In constructing the sensor net explained later, the inspection data on the building is transmitted and received between the building management server 106 and the system control device 101 via the Internet 104.

Figure 6:
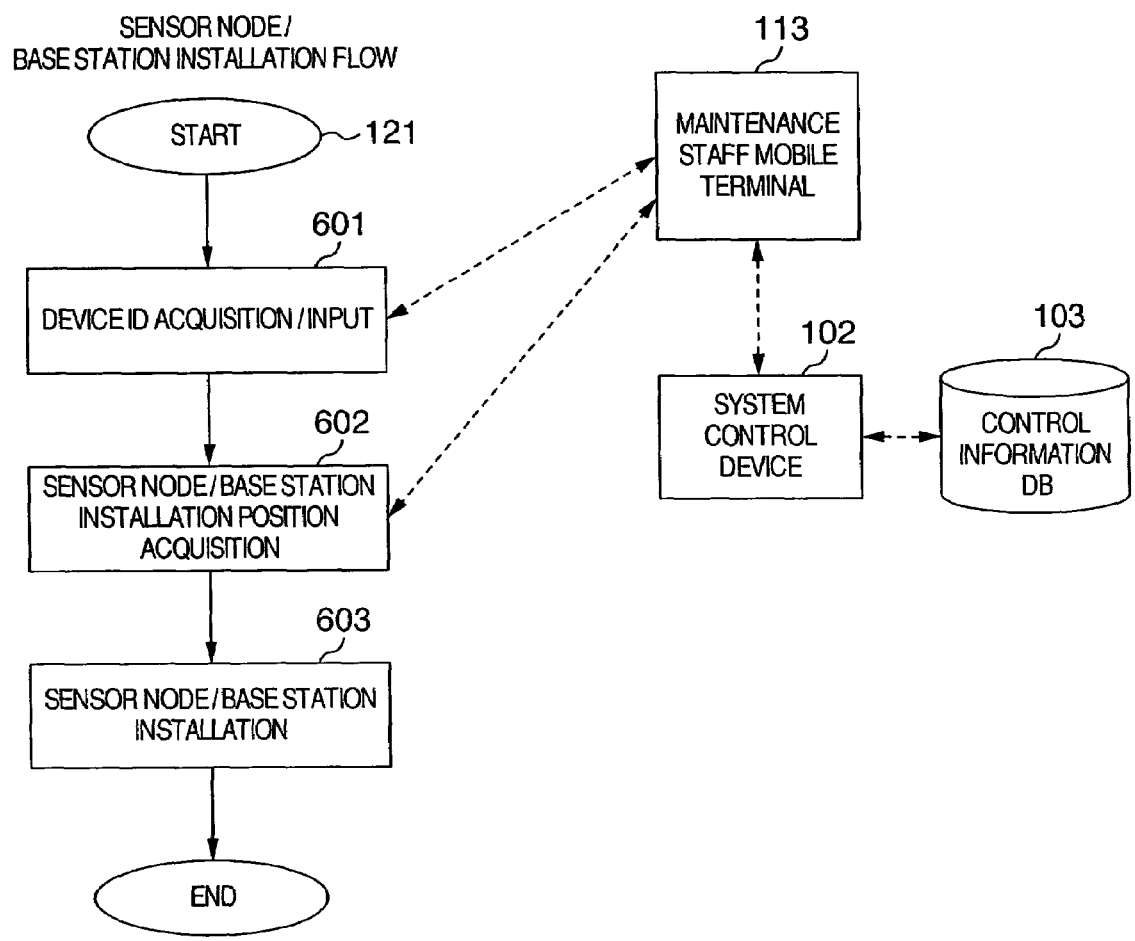
FIG. 6 is a flowchart showing the installation process of the sensor node and the base station.
Figure 7:
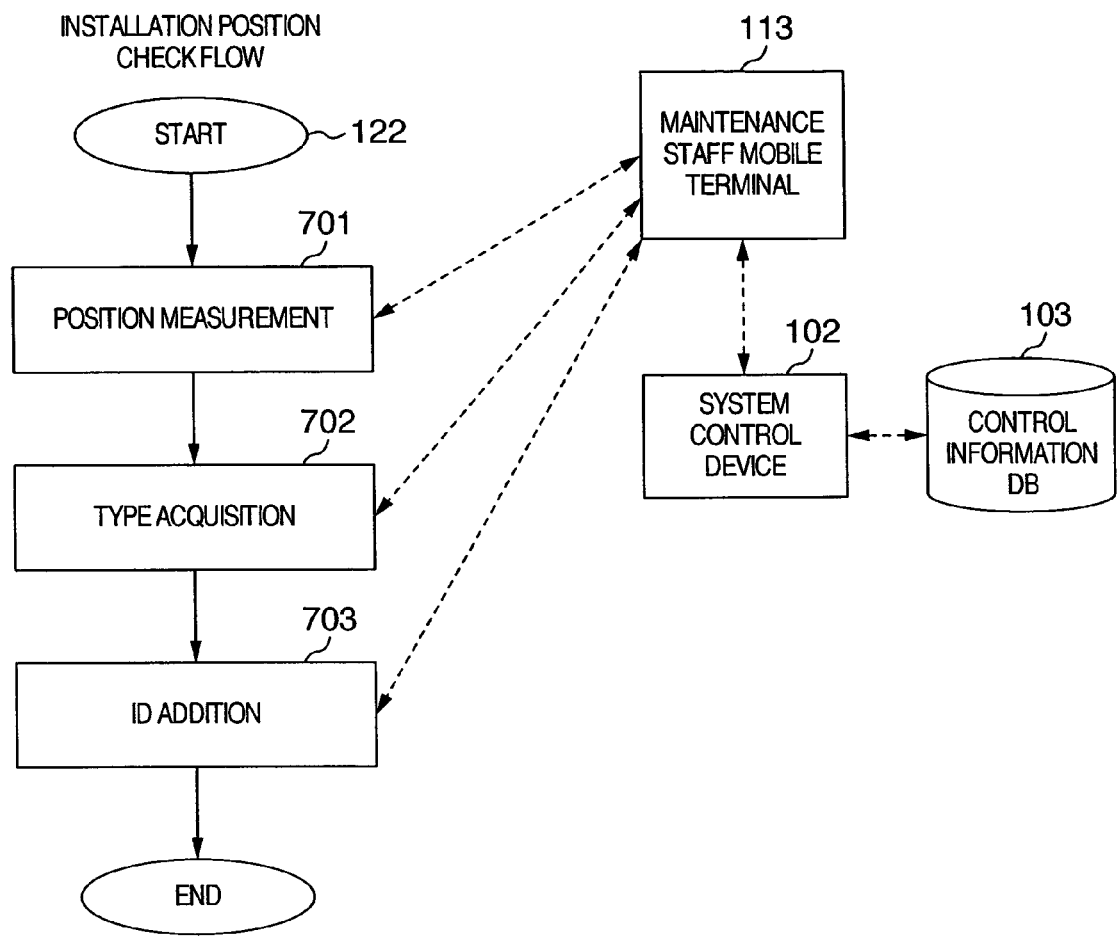
FIG. 7 is flowchart showing the installation position check process of the sensor node and the base station.

Explanation will be given on the method for constructing the sensor network upon maintenance inspection. FIG. 1, FIG. 6 and FIG. 7 show the processing flowcharts.

When a maintenance staff goes to a building to be inspected, he/she prepares the necessary instrument for the inspection including various sensor nodes for maintenance inspection, a base station, a mobile terminal for a maintenance staff, parts and instruments for maintenance. For this preparation, the maintenance staff accesses the system control device 101 so as to acquire instrument information required for the inspection of the escalator of the building and prepares instruments according to the information.

Next, explanation will be given on the work in the building. The explanation will be given in order.

(1) Sensor network construction work 1120

It should be noted that six escalators are installed in this building and one sensor network is constructed for the six escalators. Firstly, a sensor node/base station installation 121 is performed for inspecting the six escalators. The maintenance staff connects the maintenance staff mobile terminal 106 to the wireless LAN 105 of the building in advance so as to be connected to the building management server 106 and the system control device 101.

The first step of the sensor node/base station installation 121 is a device ID acquisition input 601. The device IDs of the six escalators 112 are acquired and inputted to the maintenance staff mobile terminal 113. The device ID displayed on the escalator 112 may be directly inputted or barcodes and RFID are attached to the escalators 112 so as to be read by the maintenance staff mobile terminal 113. The device IDs acquired/inputted are transmitted to the system control device 101.

Figure 9:
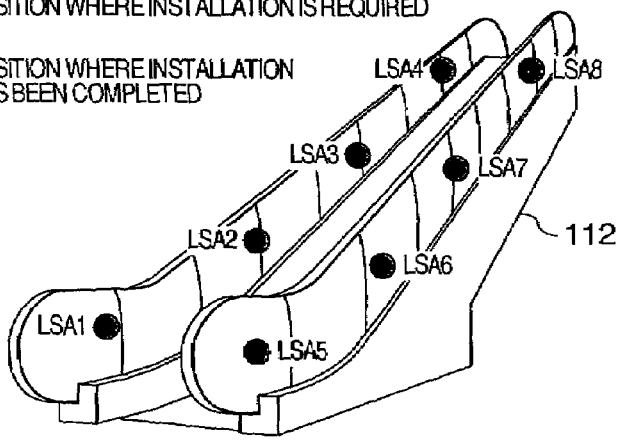
FIG. 9 shows an example of installation position at a terminal carried by the maintenance staff.

Next step is a sensor node/base station installation position acquisition 602. The system control device 101 acquires the sensor nodes of the escalators 112 and the base station installation position information from the control information DB 103 according to the device IDs received and transmits them to the maintenance staff mobile terminal 113. FIG. 8 shows the sensor node and base station installation position information 801. The installation position information 801 is not limited to a particular format if it can utilized in the position measurement explained later. The installation position information 801 includes the sensor node type/base station 802 and their installation positions 803. The maintenance mobile terminal 113 displays the necessary sensor node type/base station 802 and their installation positions 803. As shown in FIG. 9, the escalator 112 is displayed on the display screen 901 of the maintenance staff mobile terminal 113 and the installation position 803 is displayed graphically for facilitating the installation.

In this example, it is necessary to install eight sensor nodes of type SA, 20 sensor nodes of type SB, 15 sensor nodes of type SC and two base stations BS. Moreover, on the escalator 112 graphically shown on the screen, when the installation display button of the sensor node type SA is clicked, the installation positions of the sensor node type SA are shown.

Next step is a sensor node/base station installation 603. The sensor nodes are installed at the installation positions displayed. The eight sensors nodes SA and other sensor nodes and base stations are installed according to the instruction. It is preferable that in this sensor node/base station installation, the installation position check flow 122 explained below be executed.

The installation position check flow 122 is that the system control device 101 checks the installation position of the sensor nodes and the base station. The position of the sensor node attached is measured and the measured position is compared to the attachment instruction position. The position measurement 701, for example, performs communication between reference base stations at three points whose position information are specified in advance and performs three-point measurement. For example, the reference base stations are operated in synchronization with one another and the position of a sensor node is identified according to the reception difference of the arrival time of the signal transmitted from the sensor node. Moreover, it is possible to use a known measurement method. It should be noted that the three points may be sensor nodes which have been installed already for remote monitoring or may be attached for measurement of the escalator in advance. Furthermore, the sensor type is acquired, and if the comparison between the measured position and the installation instruction position results in that the sensor is installed at a correct position, a unique ID 1005 is assigned to the sensor node installed correctly.

Figure 11:
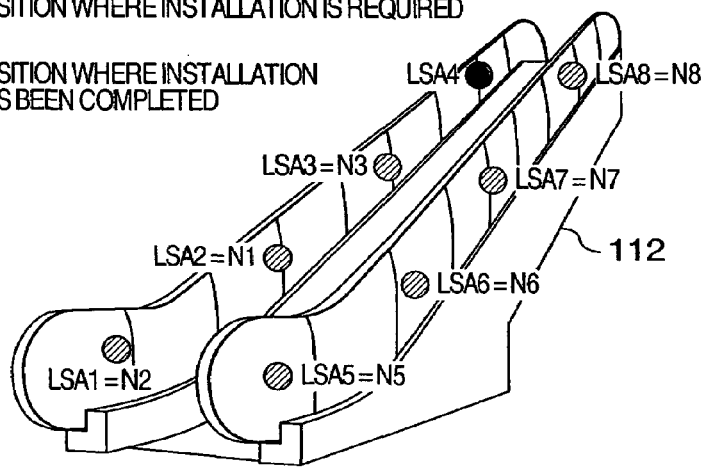
FIG. 11 shows an example of installation position at a terminal carried by the maintenance staff.

The result is stored in the control information DB 103 and the content is further displayed on the maintenance staff mobile terminal 113 and transmitted to the sensor node so as to be stored in the memory (see FIG. 10). In addition to the unique ID 1005, the screen 1001 of the maintenance staff terminal 113 shown in FIG. 10 displays measurement positions 1002, judgment results 1003 whether the installation position is correct, and the communication enabled base station/sensors 1004. Furthermore, when the escalator is depicted on the screen 902 of the maintenance staff terminal 113, display as shown in FIG. 11 appears. The sensor installation position indicated by "?" and "x" in the column of FIG. 10 is clearly shown as LSA4 in FIG. 11.

Figure 14:
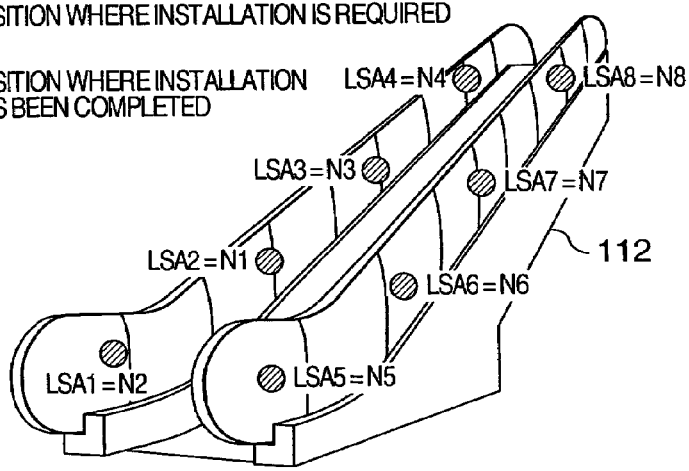
FIG. 14 shows an example of installation position at a terminal carried by the maintenance staff.

The sensor nodes and base stations not installed correctly according to the results displayed in FIG. 10 and FIG. 11 are re-attached in the sensor node/base station reinstallation 123 and the installation position check 112 is performed. The check result is displayed on the screen. FIG. 12 shows a list on the screen 1001 of the maintenance staff mobile terminal 113; FIG. 13 shows the escalator 112 on the screen 1001 of the maintenance staff mobile terminal 113; and FIG. 14 shows the content of the control information DB 103. Here, the sensor node SA is correctly installed at the position LSA4 and N4 is assigned to it as a unique ID. These series of works are repeated and the process is completed when all are correctly installed.

It should be noted that when the base station cannot be recognized, it is necessary to move the base station and further to add another base station or relay station so as to enable communication with the sensor node. This occurs when the environment around the escalator is changed. For example, an obstacle is placed around it.

(2) Maintenance inspection 124 is performed.

Various measurements 125 are performed according to the inspection items of the escalator 112 stored in the control information DB 103. Basically, the sensor node acquisition information is transmitted to the system control device 101 and the results is subjected to diagnosis. The diagnosis result is transmitted to the maintenance staff mobile terminal 113. When the result indicates that failure is present, parts repair/replacement 126 is performed according to the instruction. It should be noted that during inspection, the escalator should be moved/stopped. The instruction for this is also transmitted from the system control device 101. That is, the "procedure manual" stored in the control information DB 103 is received from the system control device 101 and inspection is performed according to the instruction. A series of maintenance inspection 124 is repeatedly performed until no failure is present.

(3) The sensor network removal 127 is performed.

When the maintenance inspection 124 is terminated, the sensor network is removed when the sensor network need be removed (according to the instruction sent from the system control device 101). That is, the sensor nodes/base station and further the base station/relay station added when required are removed. The removal result of the installed devices is checked on the maintenance staff mobile terminal 113.

The escalator maintenance inspection according to one embodiment is thus completed. According to this embodiment, there are various merits as follows:

(1) No wiring is required and the inspection cost can be reduced.

(2) Since no wiring is required, the moving portion can easily be inspected and the inspection accuracy can be increased as compared to the conventional method.

(3) Since the sensor network is temporarily constructed, an expensive sensor can be used at various places, which reduces the inspection cost.

(4) Even an inexperienced maintenance staff can easily perform inspection.

(5) The maintenance staff can easily inspect all the necessary inspection items without leaving any items not inspected.

Embodiment 2

In the embodiment 1, an example has been given on maintenance inspection performed simultaneously on six escalators. However, it is also possible to perform maintenance inspection by dividing the six escalators into several groups. Firstly, an example will be given for inspection one by one. The device ID of the first escalator is inputted so as to construct a sensor network and perform inspection. After the inspection is completed, the sensor network is removed. Subsequently, the second escalator is inspected and then the third escalator and after.

When the embodiment 1 is compared to the embodiment 2, the following differences can be seen.

(1) In the embodiment 1, the six escalators should be stopped all at once. However, the time required for inspection is shorted as compared to the embodiment 2. The necessary number of sensor nodes and the base stations is greater than the embodiment 2.

(2) In the embodiment 2, the escalator which should be stopped simultaneously is only one. However, the total time required for the inspection is longer as compared to the embodiment 1. The number of necessary sensor nodes and the base stations is smaller than the embodiment 1.

Embodiment 3

The embodiment 1 has shown an example of method of the installation position acquisition 602 in the sensor node and base station installation 121. The embodiment 3 shows more simple method.

The method is to attach the RFID to the installation position in advance. The sensor node type and the base station to be installed are recorded on the RFID so that the maintenance staff searches/reads the RFID on the maintenance staff mobile terminal 113 or the RFID reader and installs an appropriate sensor node and a base station in the vicinity of the RFID. If the escalator 112 is depicted on the maintenance staff mobile terminal 113, search of the RFID becomes more effective.

Embodiment 4

In the embodiment 1, an example has been given on a case that the unique ID 1005 is assigned to the sensor node/base station correctly installed. The present embodiment explains a more simple method.

The method is to assign the unique ID 1005 to the sensor node/base station in advance. Firstly, when the maintenance staff prepares various sensor nodes and base station for maintenance inspection before going to the object building, the maintenance staff assigns the unique ID 1005 to the respective sensor nodes and the base station. The maintenance staff assigns an arbitrary unique ID 1005 and transmits it to the system control device 101 or the unique ID 1005 is stored in the system control device 101 in advance and it is downloaded.

Embodiment 5

In the embodiment 1, the maintenance inspection work is performed while accessing various programs and data in the system control device 101 from the maintenance staff mobile terminal 113. If the various programs and data are downloaded to the maintenance staff mobile terminal 113 in advance, there is no need of accessing the lift device facility management center 110, thereby performing the work more effectively. Moreover, it is possible to download the various programs and data to the building management server.

Embodiment 6

In the embodiment 1, explanation has been given on a case that the sensor network is removed after the completion of the maintenance inspection. Here, explanation will be given on a case that the sensor network is not removed after the inspection.

(1) When a new escalator is installed and the sensor network is to be utilized for remote monitoring after that, there is a method for leaving all the instruments of the sensor network without removal or a method for leaving some of the instruments of the sensor network without removal.

(2) When renewal of the escalator is performed, the same method as (1) can be used.

In either case, the sensor network can be removed easily when the maintenance contract term has expired.

The embodiments 1 to 6 have been explained on a case of the escalators. However, the present invention is not to be limited to the escalator but can be applied to an elevator, a moving pavement, various facilities such as air conditioners, building, bridge, tunnel, and other structures which require maintenance inspection and monitoring.

Embodiment 7

In this embodiment, a brief explanation will be given on an example of application of the present invention to a bridge as other than escalators. The construction of the sensor network, maintenance inspection, and removal of the instruments are almost identical to the example of the aforementioned escalators. The inspection content is different in that the bridge is located outside a building and in a state of vibration due to passing of vehicles and wind. Accordingly, as a power source of the sensor nodes and the base station, the solar cell and vibration generation can be utilized and the service life of a battery need not be considered in many cases. This is especially advantageous when remote monitoring is performed all the time.

The present invention relates to the method for inspecting/monitoring buildings including apartment houses, structures such as bridges and tunnels, and facilities installed in the buildings and the structures such as elevator and escalator and in particular, to maintenance inspection using a sensor network which can be applied to maintenance inspection when a failure has occurred, or daily monitoring and remote monitoring.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A facility inspection/monitoring method comprising:
    acquiring identification information of a facility;
    acquiring sensor node installation-place information and base station installation-place information corresponding to the acquired identification information of the facility from a control information database which stores the sensor node installation place information and the base station installation-place information correlating to the identification information of the facility;
    constructing a sensor network which comprises at least one installed sensor node and at least one base station, in accordance with the acquired sensor node installation-place information and base station installation-place information;
    acquiring information on a state of the facility by using the constructed sensor network; and
    performing inspection or monitoring according to the acquired information on the state of the facility.

2. A facility inspection/monitoring method as claimed in claim 1, wherein when a sensor node or a base station which can be used as the sensor network is already installed in the facility, and where an additional at least one sensor node or at least one base station that is required is further installed to constitute the sensor network.

3. A facility inspection/monitoring method as claimed in claim 1,
wherein the identification information includes at least one of a device number, a manufacturing number, or an installation place of the facility and the identification information is stored in the control information database accompanying a system control device of the system performing inspection/monitoring of the facility.

4. A facility inspection/monitoring method as claimed in claim 1,
wherein the sensor node installation place and the base station installation place can be shown in combination with a form of the facility on a display device connected to a mobile terminal.

5. A facility inspection/monitoring method as claimed in claim 1,
comprising using radio frequency IDs (RFIDs) to record the at least one sensor node and the at least one base station to be installed and the RFIDs are attached to the installation place in advance, wherein a sensor node installation place and a base station installation place are searched by reading the RFIDs, and wherein the sensor node and the base station to be installed are recorded on the RFIDs and are installed on the searched sensor node installation place and the searched base station installation place.

6. A facility inspection/monitoring method as claimed in claim 1,
wherein the identification information of the facility is read by an RFID or a barcode set on the facility in advance.

7. A facility inspection/monitoring method as claimed in claim 1,
wherein a first position where a sensor node and a base station contained in the network are to be installed is compared to a second position of the sensor node and the base station after the installation, and wherein a unique ID is assigned to the sensor node and the base station when the first position is the same as the second position.

8. A facility inspection/monitoring method as claimed in claim 7,
wherein the second position after the installation is measured by a three-point measurement method.

9. A facility inspection/monitoring method as claimed in claim 1,
wherein a unique ID is assigned in advance to the at least one sensor node and the at least one base station contained in the sensor network.

10. A facility inspection/monitoring method as claimed in claim 1,
wherein the at least one sensor node or the at least one base station constituting the sensor network, can be removed entirely or partially.

11. A facility inspection/monitoring method as claimed in claim 10,
wherein the removal of the at least one sensor node or the at east one base station constituting the sensor network, is such that a smaller size sensor network than the aforementioned sensor network remains after the removal.

12. A facility inspection/monitoring method as claimed in claim 11,
wherein the smaller size sensor network is used for monitoring the facility.

13. A facility inspection/monitoring method comprising:
acquiring identification information of a facility;
contacting a control information database which stores sensor node installation-position information and base station installation-position information correlating to the acquired identification information of the facility;
constructing a sensor network which contains at least one installed sensor node and at least one base station, based on the sensor node installation-position information and the base station installation-position information contained within the control information database;
acquiring information on the state of the facility by using the constructed sensor network; and
performing inspection or monitoring according to the acquired information on the state of the facility.

14. A facility inspection/monitoring method as claimed in claim 13, comprising:
retrieving a sensor node attachment position and sensor node type stored in the database; and
acquiring, recording and transmitting device identification information of the facility.

15. A facility inspection/monitoring method as claimed in claim 14, comprising:
verifying that a correct type of the at least one sensor node was installed.

16. A facility inspection/monitoring method as claimed in claim 13.

17. A facility inspection/monitoring method as claimed in claim 16, comprising:
verifying that a correct type of the at least one sensor node was installed.

18. A facility inspection/monitoring method as claimed in claim 14, comprising:
verifying that a correct attachment position of the at least one sensor node was installed.

* * * * *